United States Patent [19]

Yoshida et al.

[11] Patent Number: 5,160,479
[45] Date of Patent: Nov. 3, 1992

[54] MOLTEN METAL STIRRING DEVICE

[75] Inventors: Tsutomu Yoshida; Toshinori Inoue; Toshihiko Shirasawa, all of Sakata; Takashi Asahina, Tsuruoka, all of Japan

[73] Assignee: Sumitomo Light Metal Industries, Ltd., Tokyo, Japan

[21] Appl. No.: 722,325

[22] Filed: Jun. 28, 1991

Related U.S. Application Data

[63] Continuation-in-part of Ser. No. 614,918, Nov. 16, 1990, abandoned.

[30] Foreign Application Priority Data

Dec. 15, 1988 [JP] Japan .................................. 1-325481
Apr. 19, 1990 [JP] Japan ............................... 2-42064[U]

[51] Int. Cl.$^5$ .......................................... B22D 41/62
[52] U.S. Cl. ................................. 266/233; 266/265
[58] Field of Search .................... 266/233, 271, 265

[56] References Cited

U.S. PATENT DOCUMENTS

| | | | |
|---|---|---|---|
| 3,813,238 | 5/1974 | Salmon et al. | 266/233 |
| 4,008,884 | 2/1977 | Fitzpatrick et al. | 266/233 |
| 4,235,626 | 11/1980 | Semin et al. | 266/233 |
| 4,463,935 | 8/1984 | Yonekawa | 266/233 |
| 4,647,021 | 3/1987 | Fuchs | 266/271 |
| 4,884,786 | 12/1989 | Gillespie | 266/233 |

FOREIGN PATENT DOCUMENTS

| | | |
|---|---|---|
| 52-153802 | 12/1977 | Japan . |
| 58-185730 | 10/1983 | Japan . |
| 0024313 | 2/1985 | Japan .................................. 266/233 |
| 61-189931 | 12/1986 | Japan . |
| 63-95099 | 6/1988 | Japan . |

*Primary Examiner*—Scott Kastler
*Attorney, Agent, or Firm*—Flynn, Thiel, Boutell & Tanis

[57] ABSTRACT

A stirring device for molten metals such as aluminum. The device involves a mechanism which inserts and dips a nozzle-shaped stirring tube into a melting furnace through an insertion hole opened in the side wall of the furnace and stirs the molten metal using the stirring tube to repeatedly suck up and blow down the molten metal.

The first claimed mechanism consists of the insertion hole opened through the sidewall at an angle and an external unit having a tilting and inserting mechanism to tilt the stirring tube and insert it into the insertion hole. The second claimed mechanism consists of a transportable structure which has a transferrable base provided with a support frame to mount the stirring tube connected to the tilting mechanism, a positioning mechanism to allow axial movement of the stirring tube, and other necessary operating units.

10 Claims, 5 Drawing Sheets

MOLTEN METAL STIRRING DEVICE

This application is a continuation-in-part of U.S. Ser. No. 07/614,918, filed Nov. 16, 1990, now abandoned.

FIELD OF THE INVENTION

This invention relates to a device to stir molten metal, especially molten aluminum. Specifically, this invention relates to a molten metal stirring device whereby a stirring tube is inserted into an insertion hole located in the wall of a melting furnace and then repeatedly sucks up and blows down the molten metal in the furnace.

BACKGROUND ART

Several stirring devices for molten metal have been introduced previously. The Japanese Patent Kokai No. 52-153802 describes the structure of a stirring device in which a stirring tube penetrates through the upper part of a side wall of a melting furnace at an inclination ranging from 25 to 60 degrees. The stirring tube is fixed against the wall. The Japanese Patent Kokai No. 58-185730 describes a structure in which a riser tube is connected to an opening in the lower part of a side wall of a melting furnace.

These devices are, however, designed with fixed stirring tubes which present various troubles in its operating process. Regarding the structure of Japanese Patent Kokai No. 52-153802, solid metal charges collide with the stirring tube to damage the tip of the tube, and the high speed hot stream of the melting metal degrades the durability of the stirring tube. Furthermore, the protrusion of the stirring tube into the melting furnace hinders efficient skimming operations. For the structure of Japanese Patent Kokai No. 58-185730, the repeated melt discharge operations promotes the deposition of scum at the inlet of the opening connected to the riser tube, which then blocks the opening and results in the shut down of furnace operation.

To resolve these problems, the inventors of this invention previously presented an improved stirring device which is described in detail in Japanese Utility Model Kokai No. 63-95099. In the improved device, a stirring tube passes through an insertion hole in the side wall of a furnace, then the stirring tube is angled using a tilting device to allow the tip of the stirring tube dip into the molten metal. This improved device, however, has no positioning mechanism to move the stirring tube along the axis of the stirring tube, so that the dipping position of the stirring tube cannot be changed and adjusted to a position to obtain the best stirring efficiency in case the depth of molten metal changes in the melting furnace. In addition, since the improved device is provided with a stationary structure to mount the stirring device next to a melting furnace, every melting furnace required its own exclusive stirring device. For factories operating more than one melting furnace, this pairing of furnace and stirring equipment raises the costs of plant investment and hinders efficient use of space. Another remaining problem concerned the function of stirring tube insertion adjustment to respond to the various types of furnace wall shapes or to the scum conditions inside the furnace.

SUMMARY OF THE INVENTION

This invention is presented to solve the above described problems pertaining to conventional technologies. One objective of this invention is to present a molten metal stirring device having a stirring tube which is inserted into the melting furnace only when the stirring of molten metal is required, and which does not inhibit skimming work, and which offers improved energy saving efficiency.

Another objective of this invention is to present a transportable stirring device which includes a mechanism to set a detachable stirring tube into the furnace at an angle using the above described tilting mechanism, and which gives freedom of flexible movement at the tip of the stirring tube, and which allows easy transport of the whole device.

This objective is achieved by the transportable molten metal stirring device in which a stirring tube is mounted on a support frame connected with a tilting mechanism via a support roll, and in which the tail end of the stirring tube is supported at a cantilever support point which moves along the stirring tube axis driven by a mechanism having a positioning feature, and in which these mechanisms and operating units are mounted on a transportable base. Since the design of the equipment includes a mechanism whereby the stirring tube is placed on the support frame via a support roll under the condition that the stirring tube is supported at a cantilevered support point on the tail end part, and at the same time, since the above described support point moves along the stirring tube axis under the control of a positioning mechanism, the tip of the stirring tube which is inserted at an angle obtains an inclined angle and has freedom of axial movement. Consequently, when the tip of the stirring tube comes in contact with some of the slug deposited on the furnace wall or the furnace bed, or a deformed part of the wall surface, the flexible properties of the stirring tube prevents the generation of excess contact pressure and prevents possible failure on the tip of the stirring tube. In addition, when the hearth depth varies or the dipping position of a stirring tube changes, the positioning mechanism guides the stirring tube to the desired site. Furthermore, all components and operation units, including a suction unit for sucking molten metal into the stirring tube and blowing it into the furnace, are mounted on a transportable base, so one stirring device can handle several melting furnaces simply by moving the device to the side of a furnace which is ready to start stirring operations. This system significantly improves the operating efficiency of a melting plant.

BRIEF DESCRIPTION OF THE DRAWINGS

FIG. 3($a$) and ($b$) are graphs showing the uniformity of temperature of molten metal and the alloy composition of this invention.

DETAILED DESCRIPTION OF THE PREFERRED EMBODIMENT

Figure 1:
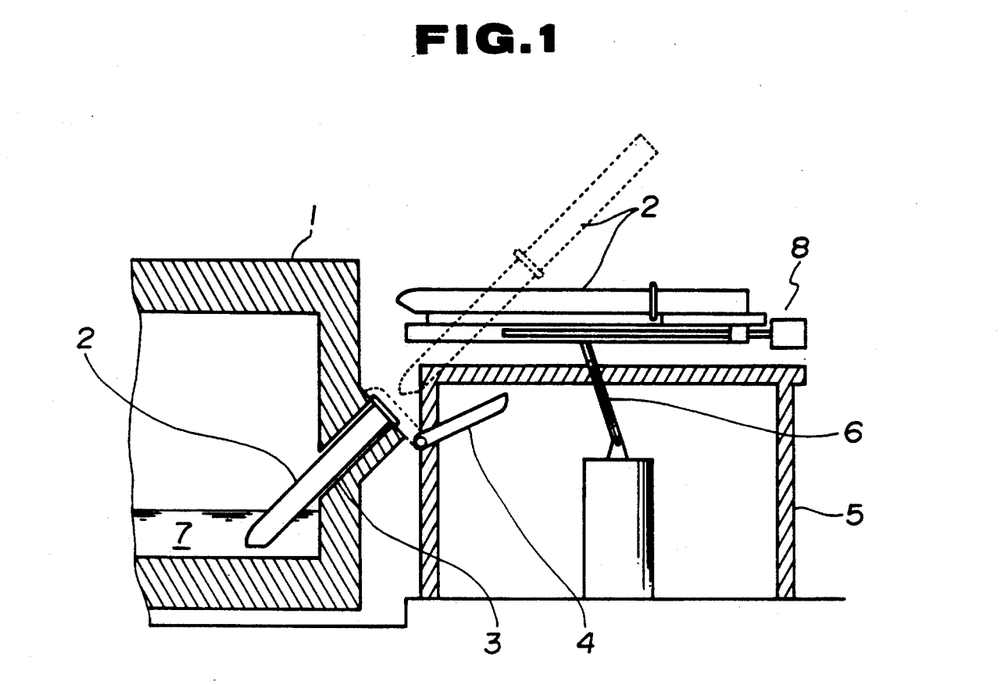
FIG. 1 shows a sectional side view of an example of the molten metal stirring device of this invention.

Refer to FIG. 1. The furnace wall 1 has an inclined insertion hole 3 which is opened to insert a nozzle-shaped stirring tube 2 downwardly from the outside hole opening. The opening of the insertion hole 3 is provided with a closure 4 which can be freely opened and closed. The closure 4 is attached to the opening of the insertion hole 3 by an adequate means, such as a hinge, and the opening of the insertion hole 3 is closed when the stirring tube 2 is not inserted into the furnace. For clarity, only the principal mechanism of the device is shown.

The stirring tube 2 is mounted on the support device 5. The support device 5 is provided with a tilting mechanism 6 which consists of a cylinder to tilt the stirring tube 2, as illustrated in FIG. 1 with a dotted line, and other components, and also is provided with an insertion mechanism 8 which feeds the tilted stirring tube 2 toward the insertion hole 3 and dips the tip of the stirring tube 2 through the insertion hole 3 into the molten metal 7 in the melting furnace. In this way, the support device 5 comprises a tilting and inserting mechanism. The tail end of the stirring tube is connected to a vacuum unit (not shown in FIG. 1) which enables the stirring of molten metal by alternatively sucking the molten metal into the stirring tube 2 and then by blowing it into the furnace using pressure.

To operate the stirring device of this invention, open the closure 4 at the opening of insertion hole 3, activate the tilting mechanism 6 on the support device 5 to tilt the stirring tube 2 as shown in FIG. 1 with the dotted line, insert the stirring tube 2 into the furnace through the insertion hole 3 using the insertion mechanism 8, then stop the insertion of the stirring tube 2 just before it dips into the molten metal 7.

At this point, preheat the stirring tube 2 to the atmospheric temperature within the furnace for an adequate period, then re-activate the insertion mechanism 8 to direct the tip (nozzle part) of the stirring tube 2 forward into the molten metal 7. Actuate the vacuum unit to perform the suction and blow-down operation of the stirring tube 2 to carry out the stirring of molten metal 7. After the completion of the stirring operation, raise the tip of the stirring tube 2 from the surface of molten metal 7 using the insertion mechanism 8. Allow the raised stirring tube 2 to stand and let the molten metal remaining in the stirring tube 2 to completely drain out. After the draining operation, actuate the insertion mechanism 8 to draw out the stirring tube 2 from the insertion hole 3, and return the stirring tube 2 to the starting horizontal position using the tilting mechanism 6. Finally, close the closure 4 at the opening of insertion hole 3.

As illustrated above, the stirring device of this invention inserts the stirring tube into the furnace only when it is needed. Thus, the stirring device prolongs the life of the stirring tube, prevents the stirring tube from suffering damage during the charge of solid metals, and eliminates the presence of an obstructing tube in the skimming area during skimming work. In addition, the stirring device adopts a tilted stirring tube insertion hole on the furnace wall, obviating the need of an enlarged insertion hole and thereby preventing excess heat dissipation.

Figure 2:
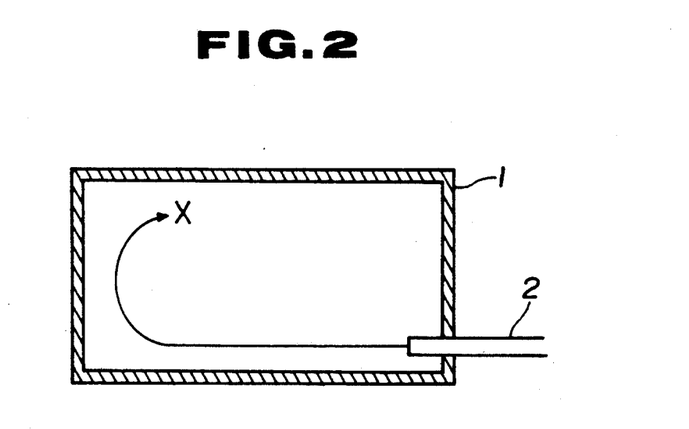
FIG. 2 shows a sectional plan view of the stirring device of this invention illustrating the stirring state within the melting furnace.

Following the above described stirring operation, when the stirring tube 2 is set up as shown in FIG. 2, the molten metal 7 sucked into and blow down from the stirring tube 2 produces a stirring flow along the direction marked by the arrow X in FIG. 2.

Figure 3A:
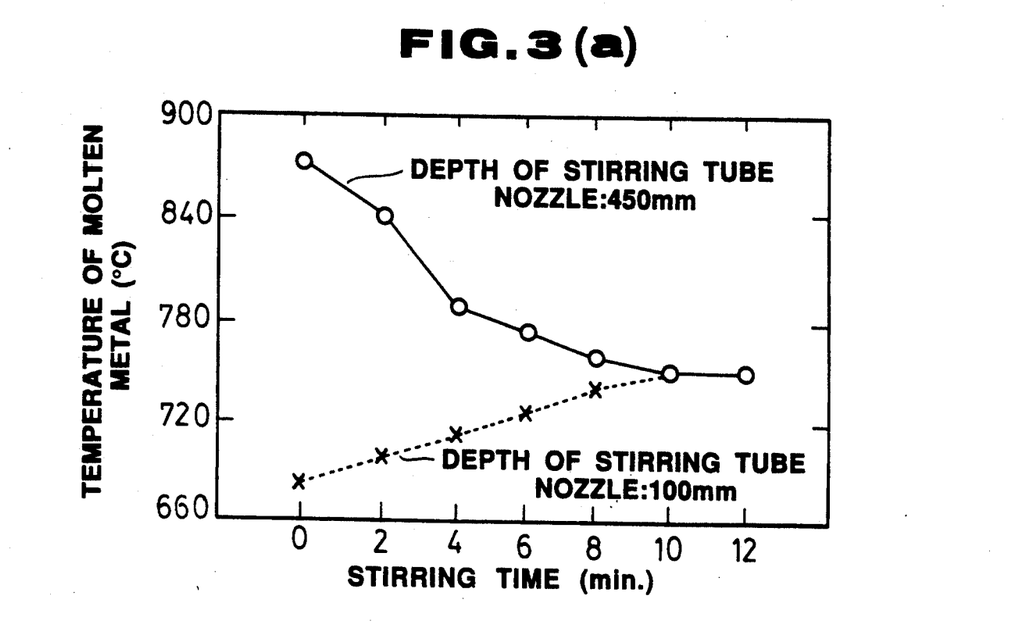
Figure 3B:
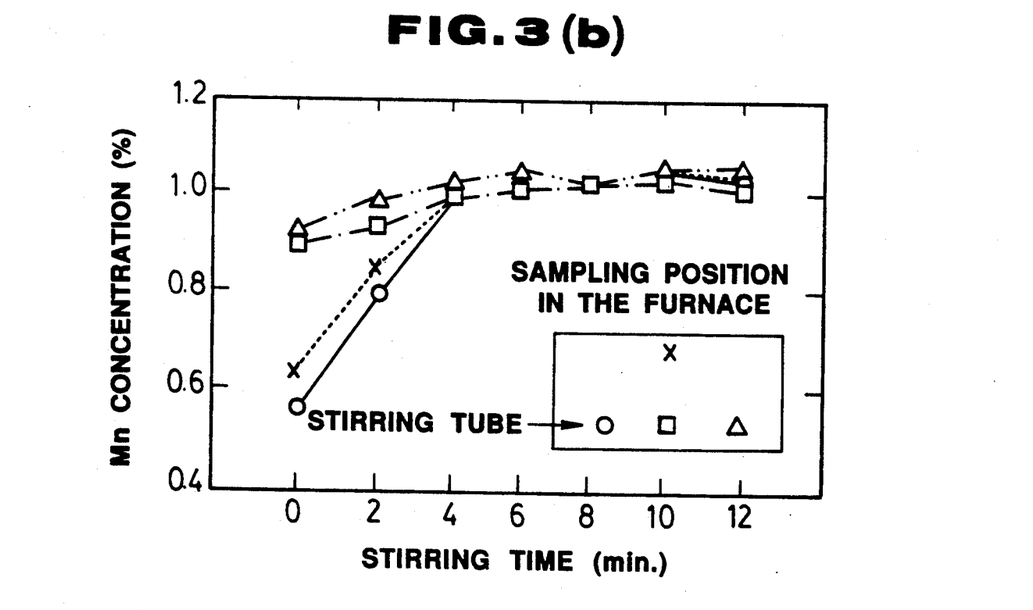

FIG. 3(a) shows the relationship between stirring time and temperature of aluminum molten metal when it is stirred by the stirring device of this invention. The figure indicates that 100% aluminum molten metal is brought to a uniform temperature within approximately 10 min. FIG. 3(b) shows the relationship between stirring time and concentration of manganese (Mn) in the aluminum molten metal.

The figure indicates that the alloy composition is brought into a uniform level within approximately 5 min. of stirring.

Figure 4:
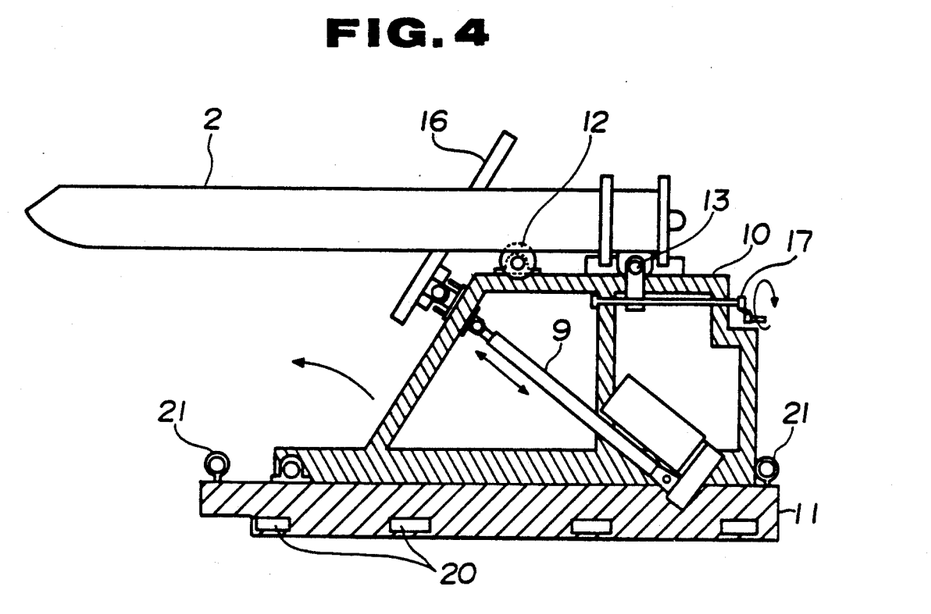
FIG. 4 shows a sectional side view of the molten metal stirring device with a transportable structure of this invention.
Figure 5:
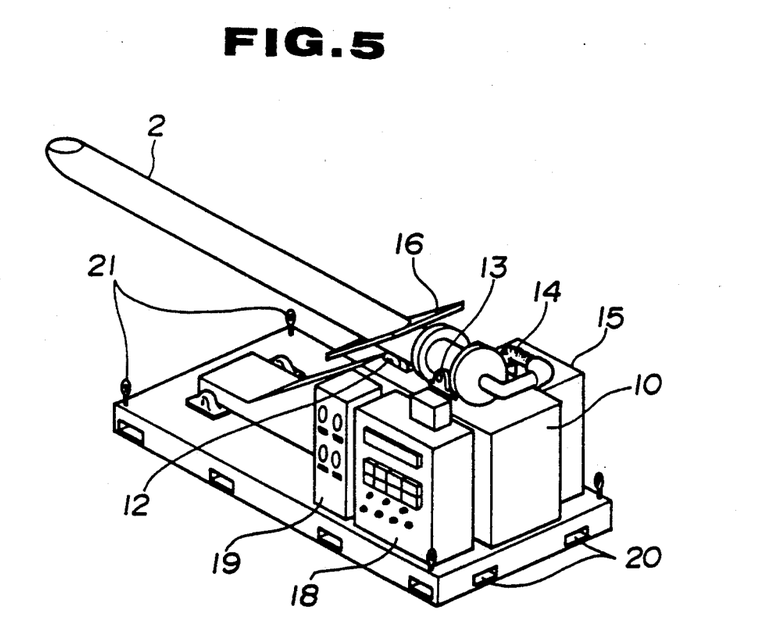
FIG. 5 is a bird's eye view of the stirring device of FIG. 4.

The stirring device shown in FIGS. 4 and 5 is transportable and has a different structure compared with the device shown in FIG. 1. The transportable device has a stirring tube 2, tilting mechanism 9, support frame 10, and base 11. The stirring tube 2 consists of a tube with sufficient length to dip its tip into the molten metal within the melting furnace and which is supported at the support point 13 of the tail end part. The stirring tube 2 is supported by the support roll 12 which is fixed on the support frame 10. The tail end of the stirring tube 2 is connected to the suction unit 15 via the bellow tube 14. The stirring tube 2 is provided with a collar 16 which covers and closes the opening of the insertion hole 3 when the stirring tube 2 is inserted into the furnace at a tilted angle. Therefore, the structure shown in FIGS. 4 and 5 does not require the opening of an inclined insertion hole on the furnace wall, the design of a narrow passage for the stirring tube, nor the installation of an open/close closure on the insertion hole.

The support unit at the cantilever support point 13 is linked up to the positioning mechanism 17 which moves along the axis of the stirring tube 2. FIG. 4 illustrates the screw mechanism driven by a hand wheel for the positioning mechanism 17. However, the driving mechanism for the positioning feature need not be limited to the configuration shown in the figure, as other mechanisms, such as power drive unit, can be used.

The tilting mechanism 9 consists of a free-expansion device, such as power cylinder, and functions to tilt the stirring tube 2 at a specified angle by pushing up the support frame 10 connected to the free-expansion device.

Other than the above described stirring tube 2, tilting mechanism 9, and support frame 10, all of the necessary operation units, including the suction unit 15, control panel 18, and instruments 19, are installed on the base 11. Also, the terminals for wiring and piping to connect with the power source and gas supply source are mounted on the base 11.

The base 11 is designed to be transportable by having fork slots 20 attached to the bottom for a fork-lift and hooks 21 on the top for a crane. To operate the stirring device of this invention, the base 11 is lifted by a fork-lift or crane, the stirring tube 2 is inserted into the insertion hole 3, and then the base 11 is put onto the floor. The stirring tube 2 is preheated to the atmospheric temperature within the furnace for an adequate period, and then the tilting mechanism 9 is actuated to dip the tip of the stirring tube 2 into molten metal 7.

Figure 6:
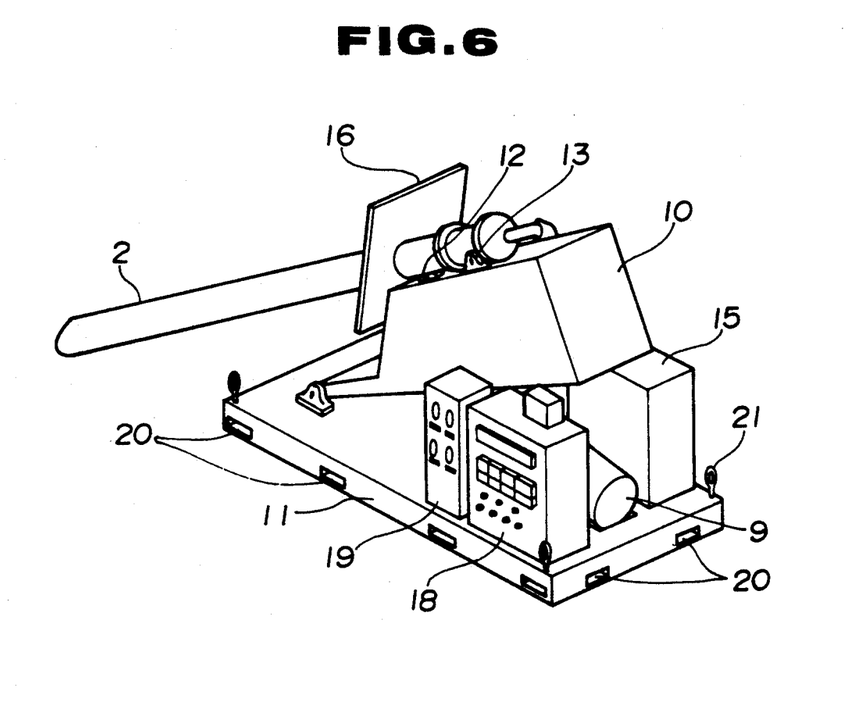
FIG. 6 is a bird's eye view of the device of FIG. 4 with tilted position of the stirring tube.
Figure 7:
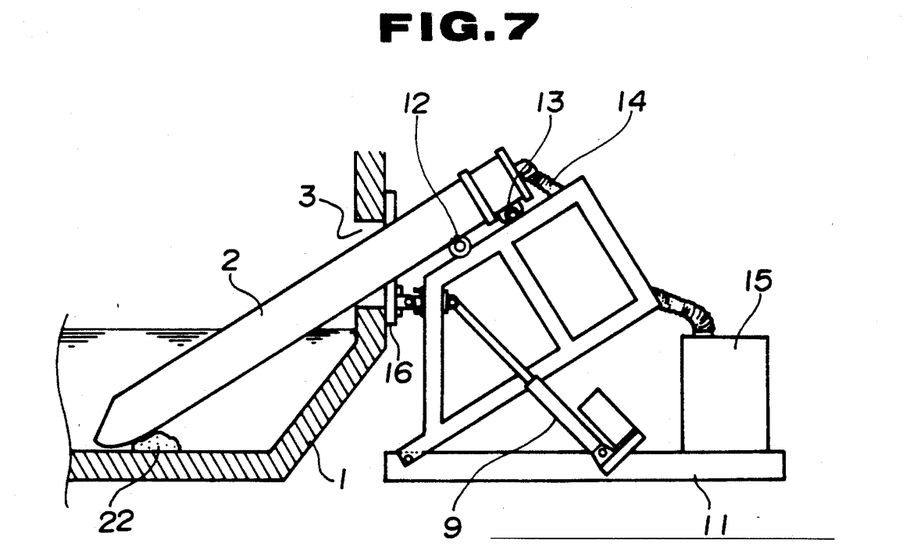
FIG. 7 is a schematic sectional view of the device of FIG. 4, the stirring tube of which is tilted and set in the melting furnace.

When the stirring tube 2 at the position shown in FIG. 4 is tilted by actuating the tilting mechanism 9, the position of the stirring tube 2 changes to that shown in FIG. 6. FIG. 7 illustrates the inserted stirring tube 2, which was preliminarily tilted as shown in FIG. 6. When some slag 22 is deposited on the hearth, the tip of the inserted stirring tube 2 naturally moves without resistance to avoid excess contact pressure. Since the positioning mechanism 17 allows the stirring tube 2 to move axially, it adjusts the distance between the hearth surface and the tip of the stirring tube 2 and also allows the tip to avoid contact with the slag 22. Then the suction unit 15 such as a vacuum unit is actuated to perform the suction and blow-down operation of the stirring tube 2 to carry out stirring of the molten metal 7.

After the completion of stirring operation using the repeated suction and blown down cycles of the stirring tube 2, draw off the stirring tube 2 from the furnace and return the stirring device to the starting position shown in FIG. 4 by reversing the steps to the above described setting procedure. Then move the stirring equipment to the next furnace for further stirring operations.

To insert the necessary length of the stirring tube 2 into the furnace, methods other than the transfer of base 11 may be used. For example, the axial movement range of the stirring tube 2 driven by the positioning mechanism 17 can be widened, or an insertion mechanism different from the positioning mechanism 17 can be added between the support frame 10 and the stirring tube 2 to perform the insertion of the stirring tube 2 into the furnace using either the positioning mechanism 17 or the newly-added insertion mechanism. These alternative mechanism allow the insertion of the stirring tube 2 after tilting it, so a stirring device having these mechanisms can also be applied to a furnace as shown in FIG. 1, which has an inclined insertion hole 3.

Figure 8:
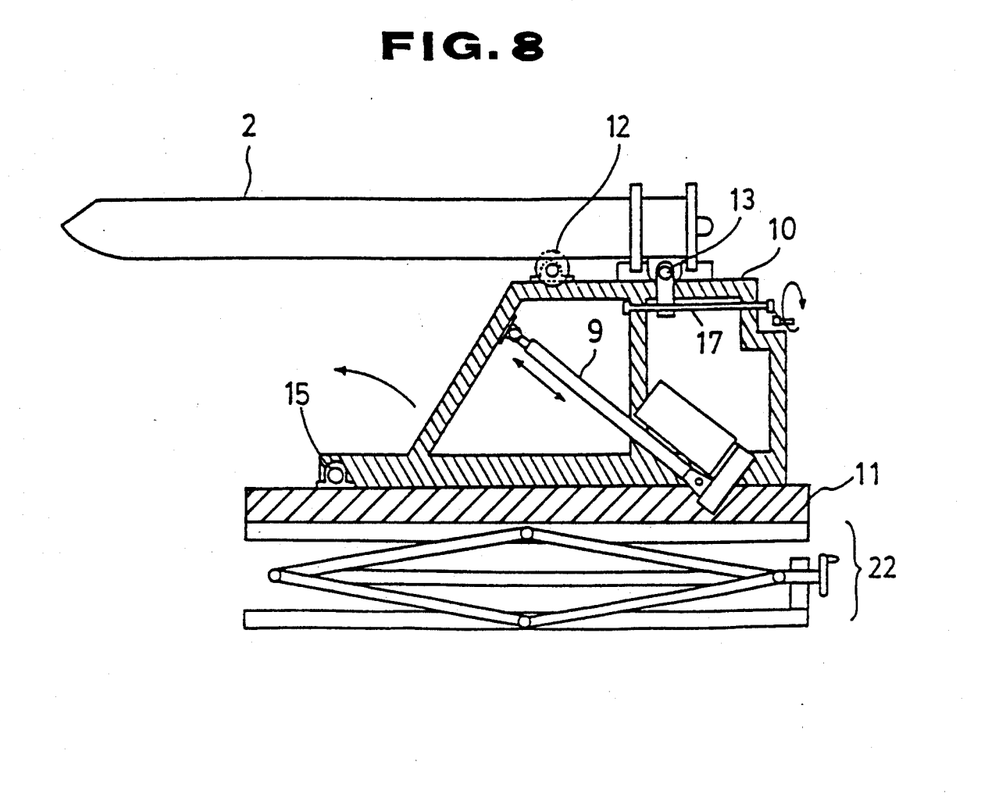
FIG. 8 shows a sectional side view of another example of the molten metal stirring device with a transportable structure of this invention.

The stirring device shown in FIG. 8 is another example of a transportable device, which is equipped with a base positioning mechanism 22 for vertically adjusting the height of the base 11.

The base positioning mechanism 22 disposed below the base 11 includes a free-expansion device, such as an oil pressure or hand-operated jack, in this case a standard scissors-type jack having a threaded rotatable operating rod which is rotated by a handwheel. The base 11 is lifted and the stirring tube 2 is brought to a predetermined height position by the operation of the positioning mechanism 22.

Figure 9:
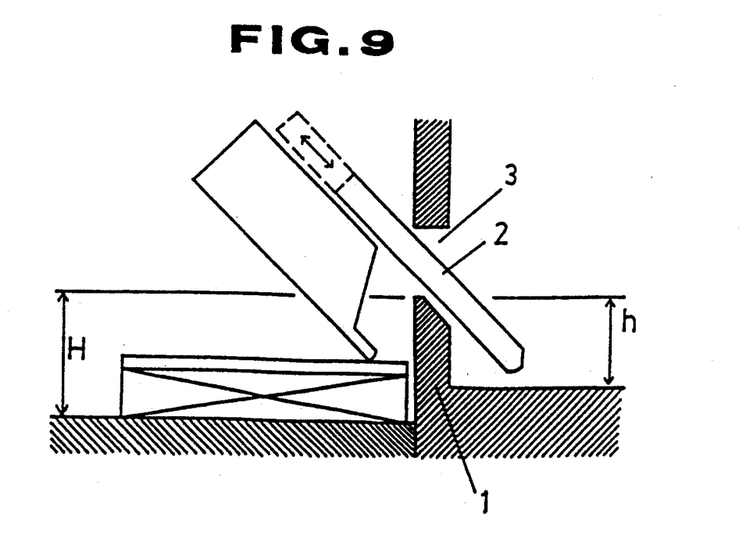
FIG. 9 shows a schematic sectional side view of the device of FIG. 8, the stirring tube of which is tilted and set in the melting furnace.

The stirring device shown in FIG. 8, in which the height position of the stirring tube 2 is changeable, can be effectively applied when stirring operations are carried out for several melting furnaces, in which the height H (FIG. 9) between the lower edge of furnace opening 3 and a floor and the height h between the lower edge of furnace opening 3 and the furnace bed are different.

As described above, the structure shown in FIG. 4 includes mechanisms which can detachably insert, tilt and set a stirring tube using the positioning mechanism for the whole equipment device as a tilting function. With these advantageous mechanisms, the stirring equipment having the structure shown in FIG. 4 assures plant stirring operation of molten metal at a high rate supported by optimum operating conditions and efficient furnace use.

What is claimed is:

1. A molten metal stirring device for stirring molten metal in a furnace through an opening in the furnace, comprising a stirring tube insertable into the molten metal in the furnace through the opening therein, a tilting mechanism to tilt said stirring tube, a support frame connected to said tilting mechanism, having a support roller to support said stirring tube, and supporting a tail end of said stirring tube at a cantilever support point so that a tip portion of said stirring tube is movable in said molten metal, a positioning mechanism to move said stirring tube relative to said support frame along the axis of said stirring tube so that a dipping position of said stirring tube in said molten metal is adjustable, and a transportable base having supported thereon said support frame, said tilting mechanism, said positioning mechanism, said stirring tube and a suction unit which is coupled to said stirring tube for alternately sucking molten metal into said stirring tube and blowing molten metal from said stirring tube back into the furnace.

2. The molten metal stirring device of claim 1, including a closure supported on the furnace at the inlet of the stirring tube insertion opening for movement between open and closed positions respectively permitting and obstructing access to the opening, and wherein said stirring tube is nozzle-shaped.

3. The molten metal stirring device of claim 1, wherein a collar is attached to close the stirring tube to close the insertion opening in the furnace wall.

4. The molten metal stirring device of claim 1, wherein the tail end of the stirring tube is connected to said suction unit via a below tube.

5. The molten metal stirring device of claim 1, wherein the tilting mechanism includes a power cylinder, to push up the support frame to tilt the stirring tube at an arbitrary inclination.

6. The molten metal stirring device of claim 1, wherein attachments for a fork-lift are provided on the base.

7. The molten metal stirring device of claim 1, wherein a hook for a crane is provided on the base.

8. The molten metal stirring device of claim 1, wherein the stirring tube is inserted into the furnace through the opening penetrating a wall of the furnace at a downward inclination from the outside to the inside of the wall.

9. An apparatus comprising: a furnace having molten metal therein and having an insertion opening through a wall thereof; and a molten metal stirring device which includes: a transportable base which is adapted to sit on a floor surface and which can be removably positioned near said wall of said furnace, a support frame supported on said base for pivotal movement about a horizontal first axis, a selectively operable power cylinder which pivots said frame relative to said base between a pivoted position and a retracted position, a roller supported on said support frame for rotation about a second axis substantially parallel to said first axis, an elongate stirring tube having an open tip end and a closed tail end, and supported on said roller for axial movement relative to said frame, stirring positioning means driven by a manually operable hand wheel and coupled to said stirring tube at a cantilever point in the region of said tail end thereof for effecting axial movement of said stirring tube, movement of said stirring tube in a first axial direction when said base is in said position near said wall of said furnace and said frame is in said pivoted position causing said tip end of said tube to move into said molten metal in said furnace through said insertion opening in said furnace, a collar plate which is provided on said stirring tube and which closes the portion of said insertion opening around said tube when said stirring tube is inserted into said furnace through said insertion opening, suction means supported on said base and in fluid communication with the interior of said stirring tube through a bellows tube coupled to said tail end of said stirring tube for alternately pressurizing and applying suction to the interior of said stirring tube to alternately suck molten metal into and blow molten metal from said stirring tube, and means on said base for facilitating lifting of said base by one of a crane and a forklift.

10. The molten metal stirring device of claim 1, including a base positioning mechanism for adjusting the vertical position of said transportable base.

* * * * *

UNITED STATES PATENT AND TRADEMARK OFFICE
CERTIFICATE OF CORRECTION

PATENT NO. : 5 160 479
DATED : November 3, 1992
INVENTOR(S) : Tsutomu YOSHIDA et al It is certified that error appears in the above-identified patent and that said Letters Patent is hereby corrected as shown below:

Column 6, line 28; delete "close".
line 32; change "below" to ---bellows---.
line 35; change "der," to ---der---.

Signed and Sealed this

Ninth Day of November, 1993

Attest:

BRUCE LEHMAN

Attesting Officer        Commissioner of Patents and Trademarks